US008887279B2

(12) United States Patent
Dheap et al.

(10) Patent No.: US 8,887,279 B2
(45) Date of Patent: Nov. 11, 2014

(54) DISTRIBUTED REAL-TIME NETWORK PROTECTION FOR AUTHENTICATION SYSTEMS

(75) Inventors: Vijay Dheap, Research Triangle Park, NC (US); Michael David Whitley, Research Triangle Park, NC (US)

(73) Assignee: International Business Machines Corporation, Armonk, NY (US)

( * ) Notice: Subject to any disclaimer, the term of this patent is extended or adjusted under 35 U.S.C. 154(b) by 436 days.

(21) Appl. No.: 13/077,548

(22) Filed: Mar. 31, 2011

(65) Prior Publication Data
US 2012/0254947 A1 Oct. 4, 2012

(51) Int. Cl.
H04L 29/06 (2006.01)
G06F 21/56 (2013.01)

(52) U.S. Cl.
CPC ............... H04L 63/20 (2013.01); G06F 21/56 (2013.01); H04L 63/1416 (2013.01); H04L 63/1441 (2013.01)
USPC ......................... 726/23; 726/1; 726/4; 726/25

(58) Field of Classification Search
CPC . H04L 63/20; H04L 63/1416; H04L 63/1441; G06F 21/56
USPC ............................................. 726/4, 23, 25, 1
See application file for complete search history.

(56) References Cited

U.S. PATENT DOCUMENTS

| 6,892,307 | B1 | 5/2005 | Wood et al. |
| 6,944,761 | B2 | 9/2005 | Wood et al. |
| 7,039,953 | B2 | 5/2006 | Black et al. |
| 7,114,183 | B1 * | 9/2006 | Joiner ............................. 726/23 |
| 7,278,160 | B2 | 10/2007 | Black et al. |
| 7,325,128 | B2 | 1/2008 | Wood et al. |
| 7,934,257 | B1 * | 4/2011 | Kienzle et al. .................. 726/23 |
| 2002/0138726 | A1 * | 9/2002 | Sames et al. .................. 713/166 |
| 2002/0178383 | A1 * | 11/2002 | Hrabik et al. ................. 713/201 |
| 2003/0084349 | A1 * | 5/2003 | Friedrichs et al. ............ 713/201 |
| 2004/0064731 | A1 * | 4/2004 | Nguyen et al. ................ 713/201 |
| 2004/0260945 | A1 * | 12/2004 | Raikar et al. .................. 713/201 |
| 2005/0273851 | A1 * | 12/2005 | Raju Datla et al. ............. 726/14 |
| 2006/0026688 | A1 * | 2/2006 | Shah ............................. 726/25 |
| 2006/0059548 | A1 * | 3/2006 | Hildre et al. ...................... 726/9 |
| 2007/0113080 | A1 * | 5/2007 | Shankar et al. ............... 713/166 |
| 2008/0034425 | A1 * | 2/2008 | Overcash et al. ............... 726/22 |
| 2008/0313721 | A1 | 12/2008 | Corella |

(Continued)

OTHER PUBLICATIONS

Song, Haoyu, et al., "Snort Offloader: A Reconfigurable Hardware NIDS Filter," IEEE 2005, pp. 493-498*

(Continued)

*Primary Examiner* — Michael Pyzocha
(74) *Attorney, Agent, or Firm* — Robert H. Frantz; Jeff S. LaBaw

(57) ABSTRACT

Information about security events detected by a group of protected web-connected resources is centrally managed in order to detect distributed attacks and slow paced attacks by providing to a plurality of web-connected resources a deployment component which couples to a native authorization service of each web-connected resource; receiving a plurality of security event reports from one or more of the deployment components by a command and control center computer; based on collected information from the plurality of security event reports, determining a threat level indicator across the plurality of web-connected resources using one or more analyses and metrics; and transmitting the threat level indicator to each of the web-connected resources.

20 Claims, 5 Drawing Sheets

(56) References Cited

U.S. PATENT DOCUMENTS

| | | | |
|---|---|---|---|
| 2009/0094584 A1 | 4/2009 | Dheap et al. | |
| 2009/0178139 A1* | 7/2009 | Stute et al. | 726/22 |
| 2009/0210699 A1 | 8/2009 | Grewal et al. | |
| 2009/0328221 A1* | 12/2009 | Blumfield et al. | 726/24 |
| 2011/0138471 A1* | 6/2011 | Van De Weyer et al. | 726/25 |
| 2012/0210387 A1* | 8/2012 | Sampigethaya et al. | 726/1 |

OTHER PUBLICATIONS

IBM; "Security zSecure Alert"; Dec. 2010.

Qlabs.com; "Meeting and Exceeding GSI/GCSx Information Security Monitoring Requirements"; Jan. 1, 2009.

Condliffe, Jamie; "Smart Servers spot and block botnet attacks"; retrieved on Mar. 9, 2011 from http://www.newscientist.com/article/mg20927975.200-smart-servers-spo.

Cooke, Evan, et al; "The Zombie Roundup: Understanding, Detecting, and Disrupting Botnets"; retrieved on Mar. 8, 2011 from http://www.eecs.umich.edu/~emcooke/pubs/botnets-sruti05.pdf.

Liu, Jing, et al; "Botnet: Classification, Attacks, Detection, Tracing, and Preventative Measures", 2009.

Schneier, Bruce; "How Bot Those Nets?"; retrieved on Mar. 9, 2011 from http://www.wired.com/print/politics/security/commentary/securitymatters.

Wang, Ping, et al; "Honeypot Detection in Advanced Botnet Attacks". International Journal of Information and Computer Security vol. 4 Issue 1, Feb. 2010.

Chuvakin, Anton; Abstract of "Security Event Analysis through Correlation", retrieved on Mar. 29, 2011 from http://www.slideshare.net/anton_chuvakin/security-event-analysisthrough-correlation.

Arcsight; "Using Advanced Event Correlation to Improve Enterprise Security, Compliance and Business Posture", retrieved on Mar. 23, 2011 http://www.arcsight.com/collateral/ArcSight_Advanced_%20Correlation.pdf.

Kimmel, Richard A.; "Experimentation Methodology for Evaluating Operational INFOCON Implementations", Jun. 2001, retrieved on Apr. 17, 2014 from www.dtic.mil/cgi-bin/GetTRDoc?AD=ADA392768.

* cited by examiner

DISTRIBUTED REAL-TIME NETWORK PROTECTION FOR AUTHENTICATION SYSTEMS

FIELD OF THE INVENTION

The invention generally relates to security systems for network resources such as networked servers, network attached storage devices, network appliances, and others, which allow for remote access of the resource via a security authentication process such as a user log in process.

BACKGROUND OF INVENTION

As the number of resources such as computer systems, web browsers, smart phones, netbooks, web servers, and special-purpose devices (e.g. web cameras, etc.) attached to the Internet rises, so does the amount of traffic dedicated to compromising the security of those systems. Commonly, such attacks are targeted at breaking into user accounts in order to obtain personal data, such as credit card and bank account information in the case of personal accounts, or such as industrial and commercial secrets in the case of employee accounts.

Turning to FIG. 2, most user authentication systems, such as UNIX™ Secure Shell (SSH) services, have protections against repeated incorrect login attempts on single device (205, 206). In this method of protection, a web-connected device is responsible for protecting itself by counting and timing the number of failed login attempts, and when these counts and times meet configurable thresholds, one or more security actions are taken according to local security policy (2051, 2061). If the breech attempts are made on a particular user account, that user account may be locked or suspended until additional security measures are completed, such as the user answering one or more security challenge questions or contacting an administrator by telephone. If the breech attempts are made across multiple user accounts on the same device, but appear to be emanating from a single Internet Protocol (IP) address, subnet, etc., then all future traffic may be blocked from that particular "hostile" IP address. The server or device that has identified the attack on itself is then protected, but that information does not help the next server that is targeted in the network.

Some attack schemes learn from the failed breach attempts, so when the attack is turned on to the next server, the attacking device has a better starting point in attempting to guess a real username and/or password. Still a further weakness in this self-protected approach is that a server may not identify the attack in time before a security breach actually occurs.

According to one available technology, once a host is determined to be hostile, that information becomes valuable and can serve to proactively protect other servers (205, 206). To answer this particular aspect of the problem, network appliance solutions (207) can handle these types of threats by simply checking traffic and applying limiting rules and blocking repeat offenders at the network level.

However, network appliances do not protect from attacks which are not so obvious, such as a distributed attack coming from multiple devices (202, 203, 204) using multiple source addresses, subnets, etc., often under the control and coordination of a master device (201). Such attacks are designed to very lightly probe a network with the specific purpose of not setting off any alarms on any particular targeted server. When login attempts become sporadic and never from the same IP address, it becomes increasingly more difficult to identify an attack from a traditional network appliance approach.

SUMMARY OF THE INVENTION

Information about security events detected by a group of protected web-connected resources is centrally managed in order to detect distributed attacks and slow paced attacks by providing to a plurality of web-connected resources a deployment component which couples to a native authorization service of each web-connected resource; receiving a plurality of security event reports from one or more of the deployment components by a command and control center computer; based on collected information from the plurality of security event reports, determining a threat level indicator across the plurality of web-connected resources using one or more analyses and metrics; and transmitting the threat level indicator to each of the web-connected resources.

BRIEF DESCRIPTION OF THE DRAWINGS

The description set forth herein is illustrated by the several drawings.

DETAILED DESCRIPTION OF EMBODIMENT(S) OF THE INVENTION

Figure 1:
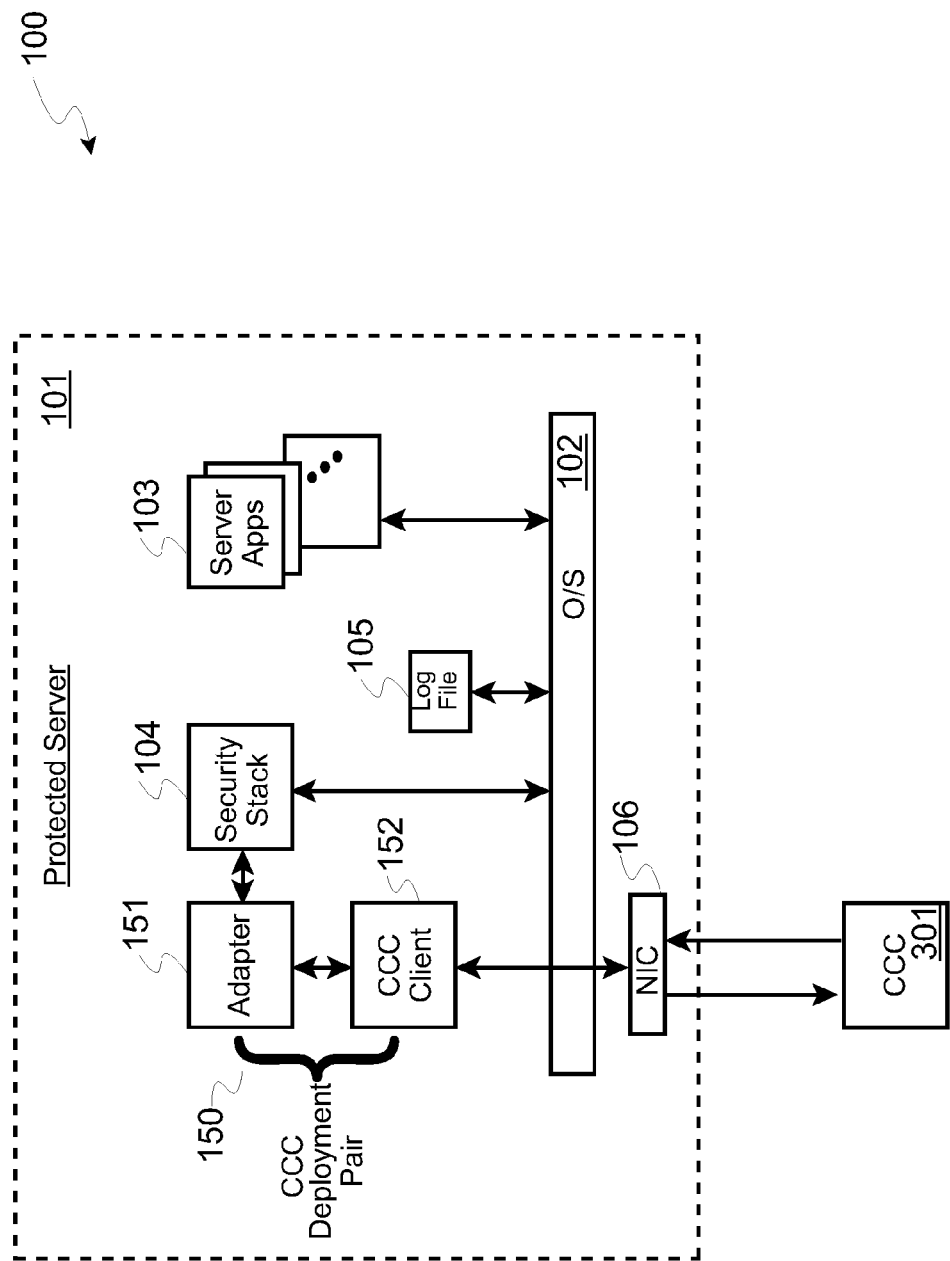
FIG. 1 illustrates a server in a functional block diagram which has been provided with a deployment pair to enable it to participate in the enhanced security processes and mechanisms according to the invention.

The inventors of the present invention have recognized a problem not yet recognized by those skilled in the relevant arts. Traditional brute force attacks and probes are relatively easy to detect and modern appliance/IDS/IPS systems can detect them. However, 'slow and go' attacks, which are paced slowly over time and often emanate from a plurality of sources and network addresses, are designed to fall "under the radar" and are thus difficult to detect by these existing methods and technologies. Many security products provide limited detection of these types of attacks, so the present solution is designed to improve on this type of detection. Embodiments of the present invention extends current attack detection methods by providing a system which can leverage existing policy driven detection as well as historical analysis of network access across all monitored web-connected resources. The new approach is to apply detection policies across all historical data in order to detect 'slow and go' attacks. By combining historical analysis, prioritization (how critical is the system, if information is available for the login, how critical is the login) and geographical location, the new solution can create a better picture of network threats.

Another advantage of the present invention is that the new solution is designed to have tighter integration with host services than other security solutions available for threat detection. Existing solutions rely on security event log analysis, whereas the new approach according to the present invention is to integrate, where possible, with the authorization service of each protected web resource through pluggable systems or through custom client applications. This allows for better real-time analysis of threats and the ability to provide automated responses.

According to the present inventions to overcome the limitations of the existing security processes of web-connected resources such as web servers, network attached storage devices, and special-purpose web devices, individual authorization services of the web-connected resources send notifications to a command and control center (CCC) computer centralized repository about failed login attempts, preferably in real-time. Through a set of metrics, the CCC determines the threat to individual authorization services which are sending it information, including consideration of other reports from other authorization services of other devices which are also reporting to the CCC.

The results of this consolidated, panoramic threat analysis across the multiple devices is relayed back to the individual authorization services of the web-connected resources, where each individual authorization service can determine to proactively act, such as by reducing failed login attempts before a lockout, reducing authentication methods allowed, or by even locking down the entire web-connected resource. At least one benefit of the solution of the present invention is that each individual authorization service which is connected to the CCC, which may itself be centralized or distributed, can send and receive real-time data on the threat against its own security as well as information on threats to other web-connected resources served by the CCC. With this method, the 'network' is no longer contained to a single site or data center—it becomes the sum of all connected "clients" from across the world.

A consideration to the implementation of security systems according to this new approach is that it requires tighter integration with existing security mechanisms than the approach of using network appliances. Unlike a network appliance that can be installed in an intervening position between a network and the resource it is to protect, this new method requires a specialized adapter for each security mechanism in order to facilitate the reporting of the failed authorization attempts in real-time. Given the vulnerabilities of network appliances to not detect distributed attacks, this consideration of the new method is outweighed by the benefits it provides.

According to at least one embodiment of the invention, the new arrangement includes three components: (1) a server acting as the Command and Control Center (CCC), (2) a client component to report security events to the CCC from the protected web-connected resources and to receive threat level assessments from the CCC, and (3) an adapter component to interface each client module to specific authorization services running on each protected web-connect resource.

The CCC server provides the role of collecting and analyzing the security event reports from the plurality of protected resources, including, preferably, a data repository for storing the reported events so that they can be analyzed over time. Through a set of metrics, the CCC server determines the threat against individual protected resources based on current patterns in requests across all protected resources. These metrics can include, for example, the frequency of IP addresses, the frequency of subnet addresses, general hostility toward certain groups of client servers, failure rates, or any combination of statistics available for measure. This calculated threat level is then communicated back to all protected resources, which are subscribed and sending it information.

The client component and the adapter component are two separate entities which can be bundled together into a deployment pair when installed on a protected resource. Through a plug-in based architecture, the web-connected resource is enhanced to include capabilities to communicate with the CCC server. The deployment pair can be bundled to include different adapter components depending on what type of authorization service it will be attached to.

The adapter component's purpose is to provide an entry point into the authorization service on a specific protected resource to:
(a) gather information, either through modifying the service or through packet monitoring, which can be sent back to the CCC server; and
(b) provide functions which can be used to react to information sent back from the CCC server, such as modifying the host file to block IP ranges or local firewall settings.

The client component's purpose is to:
(a) provide a set of application programming interfaces (API's) which can be used to, securely, send information gathered by the adapter to the CCC server; and
(b) receive incoming notifications from the CCC server and call the adapter functions to handle local security changes.

Figure 2:
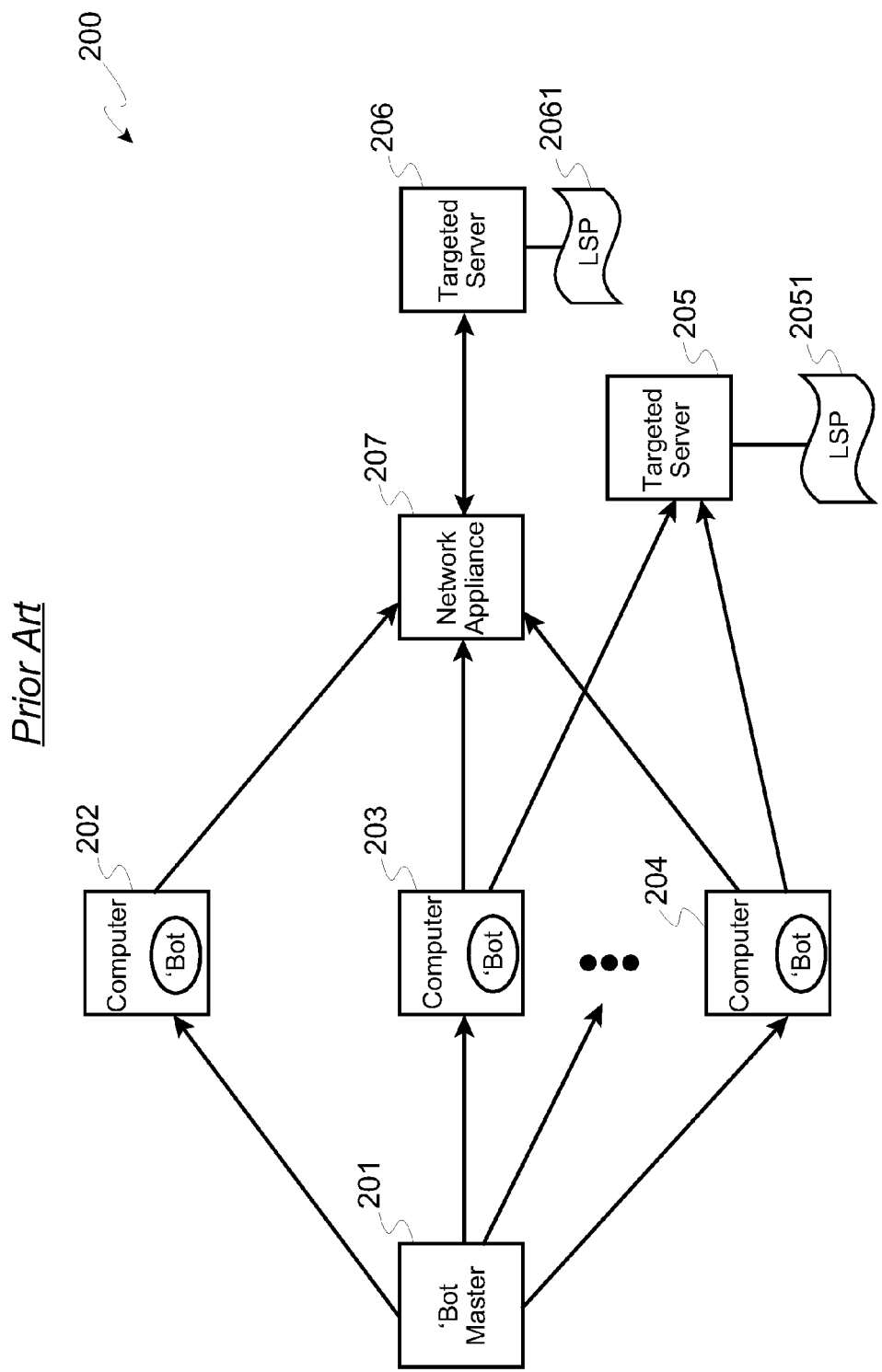
FIG. 2 depicts an arrangement of networked resources which are subject to attack by a plurality of "netbots" according to one known breech scenario.

Referring now to FIG. 1, a functional block diagram (100) of a protected resource such as a web server is shown according to an embodiment of the present invention. The protected server (101) includes a typical operating system (O/S) (102), such as UNIX™, AIX™, Windows™, and LINUX™, one or more server applications (103), a network interface (NIC) (106) for normal communications with clients such as web browsers or other servers, and a native security stack (104), such as a Secure Shell (SSH) or security event log (105) analysis process. The configuration or settings of thresholds and limits of the native security stack comprise a minimal Local Security Policy (2051, 2061 of FIG. 2). More extensive and more capable native security stacks may also be provided to the protected server (101).

The protected resource is also provided with the CCC deployment pair (150), including a CCC client component (152) and an adapter component (151), the latter of which is specific to the particular security stack (104) provided on the protected resource. The functions and operations of the CCC client component and the adapter components has been described in the foregoing paragraphs. In this extended configuration of the protected resource, the CCC client component may communicate the security event reports to the CCC server (301) via the NIC (106) across a computer network such as the Internet.

Figure 3:
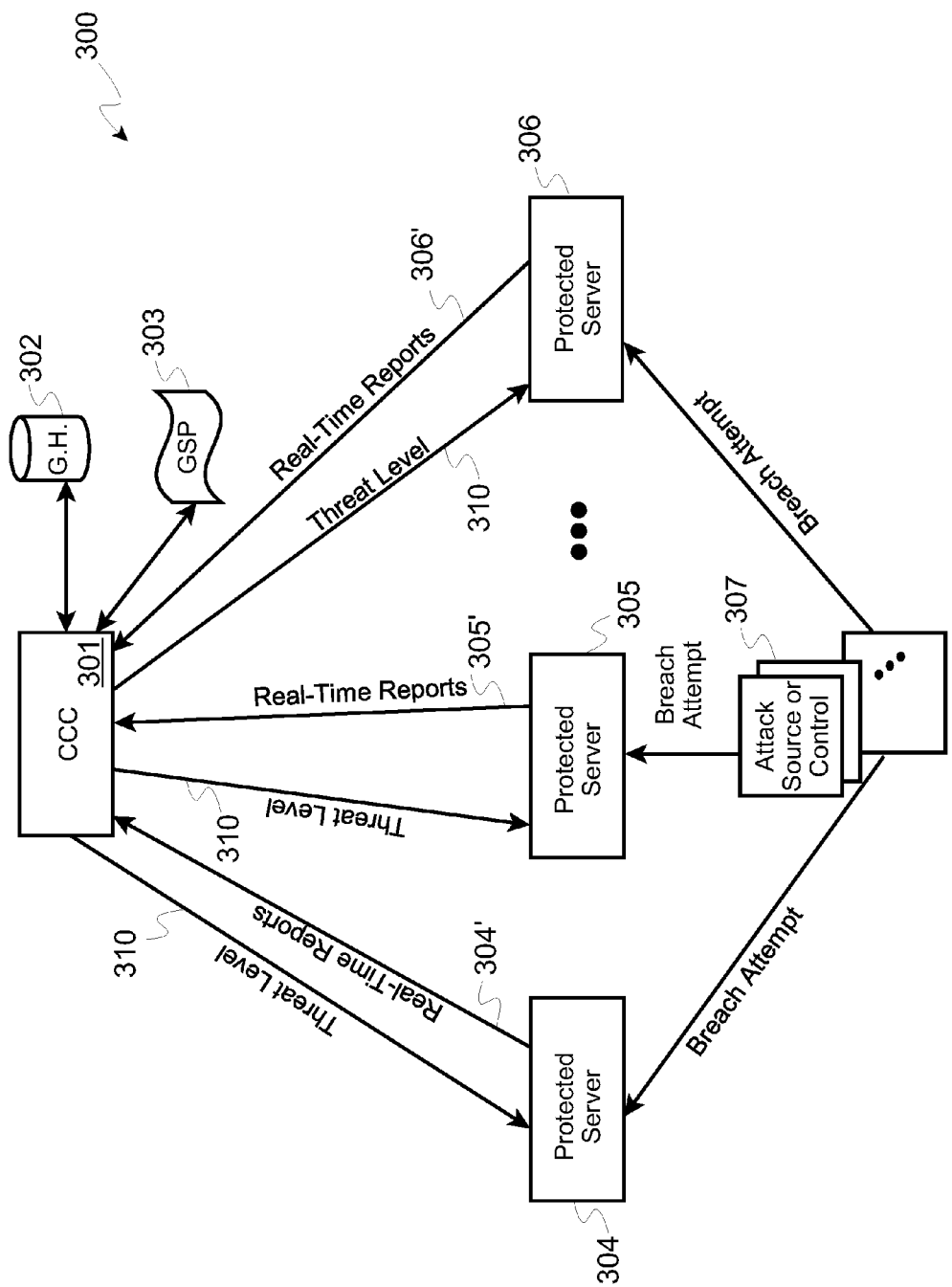
FIG. 3 shows an arrangement of servers, attack source(s) and the command and control center according to at least one embodiment of the invention.

Now referring to FIG. 3, the interoperational arrangement (300) according to the invention of the CCC server (301), multiple protected resources (304, 305, 306), and one or more sources of security attacks (307) is shown. As each breach attempt from the attack sources is reported (304', 305', and 306') by the protected resources to the CCC server (301), the reports are preferably indexed and stored in a global history store (302), where they can be analyzed according to a Global Security Policy (GSP) (303) by the CCC server (301). The results of the analysis are provided back to the protected servers (304, 305, 306) via threat level notifications (310). Upon receipt of the threat level notifications (310), the protected resources may take security breach abatement actions according to the locally-collected information (e.g. the number and timing of the security events at the particular resource) as well as according to the global threat level indications from the CCC server (301).

Figure 4:
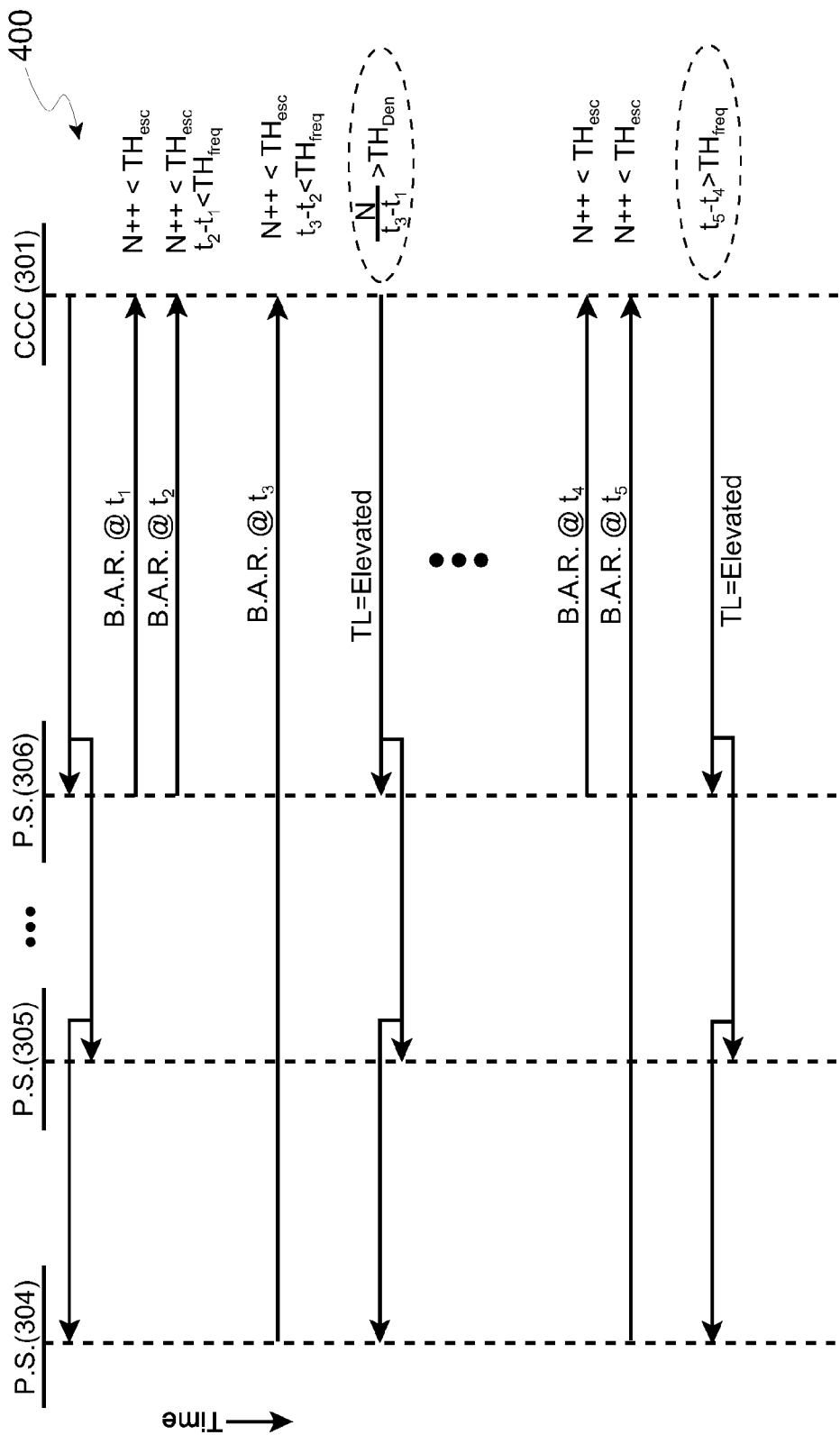
FIG. 4 illustrates exemplary logical processes and interactions between protected servers and the command and control center according to at least one embodiment of the present invention.

In FIG. 4, the logical processes according to at least one embodiment of the invention are illustrated, wherein time progresses from top to bottom of the diagram (400). Initially, or in a quiescent state, the CCC server (301) transmits a threat level indication of "normal" (TL=Normal) to each of the protected resources (304, 305, 306) via the network and the deployment pairs as previously disclosed.

In this example, a first protected resource (306) reports a breach attempt at time $t_1$, so the CCC (301) increments a count N of total event reports, but determines that the count N is less than an escalation threshold ($N<TH_{esc}$), so no threat level indication is transmitted. Or, in the case of continuously or periodically transmitted threat level indications, the next indication is still set to "normal".

Continuing with this example, a second protected resource (305) reports a breach attempt at $t_2$. Again, the CCC (301) increments the report count N across all resources, and determines that the count N is still less than the escalation threshold ($N<TH_{esc}$), so the threat level remains at "normal". Also, according to another metric, the CCC (301) may compare the time between the first and second reports to a frequency of events threshold ($t_2-t_1<TH_{freq}$) to determine if the threat level indication should be raised due to the period of time between the events being reported across all protected resources.

Similarly, a third security event is reported from a third protected server (304) at time $t_3$. At this time, the increment count of events N still does not exceed the escalation threshold, and each of the protected resources has only experienced one event each so their individual (native) authorization services also would not be alert to a distributed attack. However, at this point in this example, the number of events (three total) across all protected resources in the elapsed period of time since the first report shows a density of events (for all protected resources) above a threshold ($[N/(t_3-t_1)]>TH_{density}$), so the threat level indicator is escalated to "elevated" and communicated from the CCC (301) to each of the protected servers (304, 305, 306).

Then, when additional security events are reported at $t_4$ and $t_5$, the total time between events also exceeds the frequency threshold ($t_2-t_2>TH_{freq}$), so the threat level indicator is further escalated to "critical" and it is communicated to from the CCC (301) to the protected servers (304, 305, 306).

The foregoing examples shown in FIG. 4 are meant to illustrate but a few of the possible metrics that the CCC can implement to escalate or de-escalate threat levels. In practice, other metrics may also be used, such as counting events sourced from particular IP addresses or particular subnets. Further, the security event reports from the protected resources may include indications of particular usernames which are being attacked, and IP address and subnet sources of the attack, as well as other factors as may be useful in detecting distributed or paced attacks across all of the protected resources. The threat level indication may take other forms, rather than normal/elevated/critical, but instead four or more levels, and may or may not include specific indications of levels for specific usernames, user accounts, server type, application identifiers, IP addresses and subnet masks.

Suitable Computing Platform

Regarding computers for executing the logical processes set forth herein, it will be readily recognized by those skilled in the art that a variety of computers are suitable and will become suitable as memory, processing, and communications capacities of computers and portable devices increases. In such embodiments, the operative invention includes the combination of the programmable computing platform and the programs together. In other embodiments, some or all of the logical processes may be committed to dedicated or specialized electronic circuitry, such as Application Specific Integrated Circuits or programmable logic devices.

Figure 5:
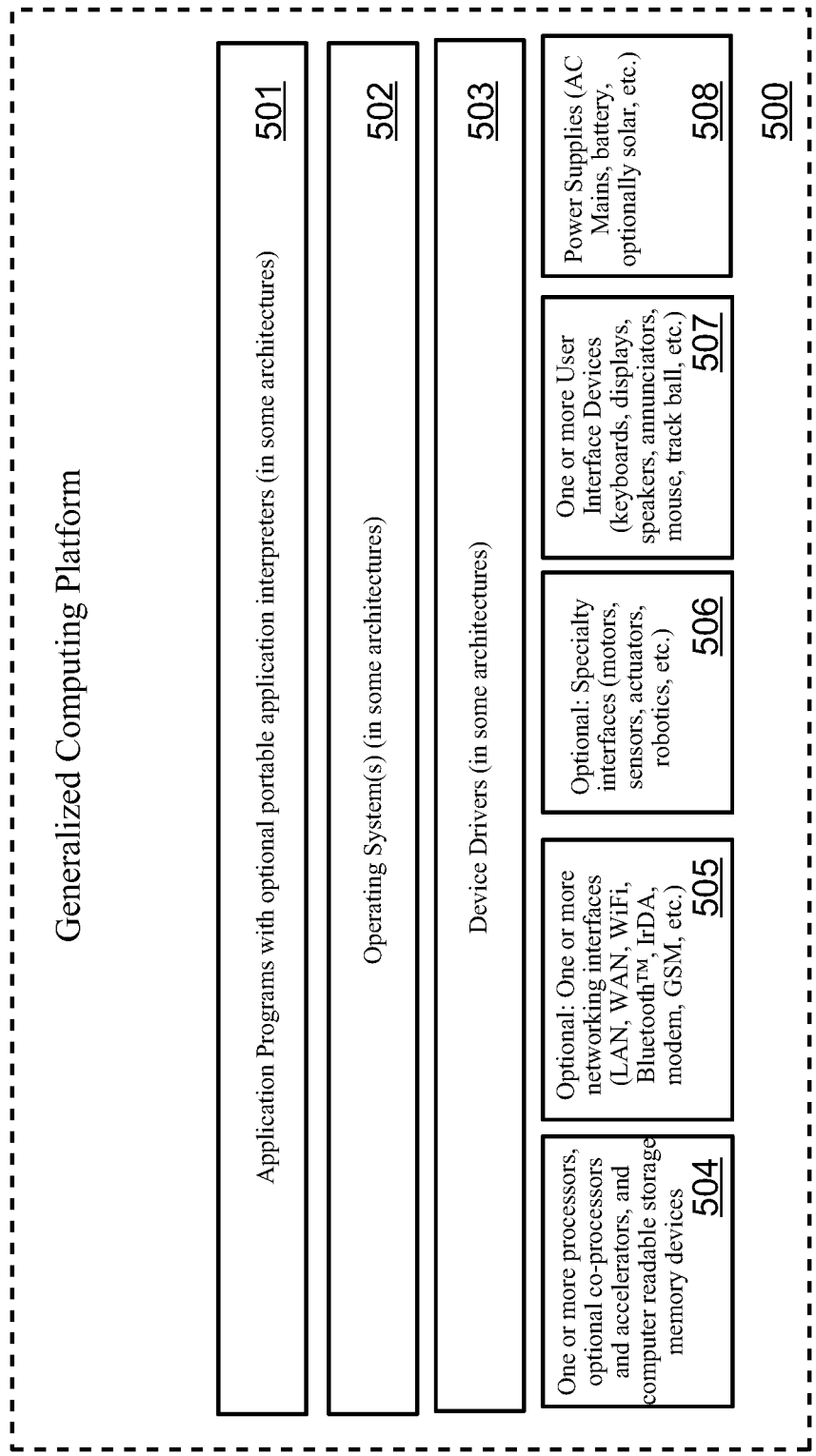
FIG. 5 sets forth a generalized architecture of computing platforms suitable for at least one embodiment of the present invention.

The present invention may be realized for many different processors used in many different computing platforms. FIG. 5 illustrates a generalized computing platform (500), such as common and well-known computing platforms such as "Personal Computers", web servers such as an IBM iSeries™ server, and portable devices such as personal digital assistants and smart phones, running a popular operating systems (502) such as Microsoft™ Windows™ or IBM™ AIX™, Palm OS™, Microsoft Windows Mobile™, UNIX, LINUX, Google Android™, Apple iPhone iOS™, and others, may be employed to execute one or more application programs to accomplish the computerized methods described herein. Whereas these computing platforms and operating systems are well known an openly described in any number of textbooks, websites, and public "open" specifications and recommendations, diagrams and further details of these computing systems in general (without the customized logical processes of the present invention) are readily available to those ordinarily skilled in the art.

Many such computing platforms, but not all, allow for the addition of or installation of application programs (501) which provide specific logical functionality and which allow the computing platform to be specialized in certain manners to perform certain jobs, thus rendering the computing platform into a specialized machine. In some "closed" architectures, this functionality is provided by the manufacturer and may not be modifiable by the end-user.

The "hardware" portion of a computing platform typically includes one or more processors (504) accompanied by, sometimes, specialized co-processors or accelerators, such as graphics accelerators, and by suitable computer readable memory devices (RAM, ROM, disk drives, removable memory cards, etc.). Depending on the computing platform, one or more network interfaces (505) may be provided, as well as specialty interfaces for specific applications. If the computing platform is intended to interact with human users, it is provided with one or more user interface devices (507), such as display(s), keyboards, pointing devices, speakers, etc. And, each computing platform requires one or more power supplies (battery, AC mains, solar, etc.).

Conclusion

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof, unless specifically stated otherwise.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It should also be recognized by those skilled in the art that certain embodiments utilizing a microprocessor executing a logical process may also be realized through customized electronic circuitry performing the same logical process(es).

It will be readily recognized by those skilled in the art that the foregoing example embodiments do not define the extent or scope of the present invention, but instead are provided as illustrations of how to make and use at least one embodiment of the invention. The following claims define the extent and scope of at least one invention disclosed herein.

What is claimed is:

1. A method for centrally managing information about security events detected by a group of protected web-connected resources, the method comprising:
receiving a plurality of security event reports from one or more deployment components by a first computer, wherein each of the deployment components is coupled to a native service local to one of a plurality of web-connected resources of a plurality of additional, separate computers;
based on the received security event reports, determining by the first computer a threat level indicator across the plurality of web-connected resources using one or more analyses and metrics;
transmitting the determined threat level indicator to each of the web-connected resources of a plurality of the additional, separate computers;
receiving the threat level indicator by each of the web-connected resources of the plurality of additional, separate computers; and
one or more of the native services of the plurality of additional, separate computers selecting and performing a security breach abatement action according to the received threat level indicator, wherein the selecting is performed by the native service according to a Security Policy local to each corresponding additional, separate computer;
wherein the threat indicator excludes instructions for security breach abatement.

2. The method as set forth in claim 1 wherein a security event report relates to a failed login attempt.

3. The method as set forth in claim 1 wherein analyses and metrics include a match to a pattern indicative of an organized attack across the plurality of web-connected resources.

4. The method as set forth in claim 1 further comprising enacting a security action across the plurality of web-connected resources responsive to an escalation of the threat level indication.

5. The method as set forth in claim 4 wherein the security action comprises one or more actions selected from the group consisting of reducing failed login attempts allowed before an account lockout is enabled, reducing authentication methods allowed before an account lockout is enabled, and locking down the plurality of web-connected resources.

6. The method as set forth in claim 1, wherein the deployment components comprise client components to communicate with the computer and an adapter component to interface the client component to a specific native authorization and security service of a protected web-connected resource.

7. The method as set forth in claim 1 wherein the web-connected resources comprise at least one device selected from the group consisting of a web server, a web browser, a web-enabled phone, and a special purpose web device.

8. A computer program product for centrally managing information about security events detected by a group of protected web-connected resources, the computer program product comprising:
a plurality of computer readable tangible storage memory devices;
first program instruction stored by one of the memory device to receive a plurality of security event reports from one or more deployment components by a first computer, wherein each of the deployment components is coupled to a native service local to one of a plurality of web-connected resources of a plurality of additional, separate computers;
second program instruction stored by one of the memory device to, based on the received security event reports, determine by the first computer a threat level indicator across the plurality of web-connected resources using one or more analyses and metrics;
third program instruction stored by one of the memory device to transmit the determined threat level indicator to each of the web-connected resources of the plurality of the additional, separate computers;
fourth program instructions stored by one of the memory device to receive the threat level indicator by each of the web-connected resources of the plurality of the additional, separate computers; and
fifth program instructions stored by one of the memory device for one or more of the native services of the plurality of the additional, separate computers to select and perform a security breach abatement action according to the received threat level indicator, wherein the selecting is performed by the native service and according to a Security Policy local to each corresponding additional, separate computer;
wherein he threat indicator excludes instructions for security breach abatement.

9. The computer program product as set forth in claim 8 wherein the first program instruction receive a security event report comprising a failed login attempt.

10. The computer program product as set forth in claim 8 wherein the second program instruction comprise program instruction to a match to a pattern indicative of an organized attack across the plurality of web-connected resources.

11. The computer program product as set forth in claim 8 further comprising sixth program instruction stored by the memory device to enact a security action across the plurality of web-connected resources responsive to an escalation of the threat level indication.

12. The computer program product as set forth in claim 11 wherein the enacted security action comprises one or more actions selected from the group consisting of reducing failed login attempts allowed before an account lockout is enabled, reducing authentication methods allowed before an account lockout is enabled, and locking down the plurality of web-connected resources.

13. The computer program product as set forth in claim 8, wherein the deployment components comprise client components to communicate with the computer and an adapter component to interface the client component to a specific native authorization and security service of a protected web-connected resource.

14. The computer program product as set forth in claim 8 wherein the deployment components of at least one device selected from the group consisting of a web server, a web browser, a web-enabled phone, and a special purpose web device.

15. A system for centrally managing information about security events detected by a group of protected web-connected resources, the system comprising:
- a hardware portion of a first computing platform to perform a logical process;
- a plurality of web-connected resources of a plurality of additional, separate computers, each of which is coupled to a native authorization service of each web-connected resource;
- a report input portion of the first computing platform to receive a plurality of security event reports from one or more of the deployment components by, wherein each of the deployment components is coupled to a native service local to one of a plurality of web-connected resources of the plurality of the additional, separate computers;
- a threat level analyzer portion of the first computing platform to, based on the security event reports, determine a threat level indicator across the plurality of web-connected resources using one or more analyses and metrics;
- an indicator output to transmit the threat level indicator from the first computing platform to each of the web-connected resources of the plurality of the additional, separate computers; and
- one or more of the native services of the plurality of additional, separate computers selecting and performing a security breach abatement action according to the received threat level indicator, wherein the selecting is performed by the native service according to a Security Policy local to each corresponding additional, separate computer;

wherein the threat indicator excludes instructions for security breach abatement.

16. The system as set forth in claim 15 wherein the report input is configured to receive a report of a failed login attempt.

17. The system as set forth in claim 15 wherein the threat level analyzer is configured to match to a pattern indicative of an organized attack across the plurality of web-connected resources.

18. The system as set forth in claim 15 further comprising a security action portion of the computing platform to enact a security action across the plurality of web-connected resources responsive to an escalation of the threat level indication.

19. The system as set forth in claim 18 wherein the security action comprises one or more actions selected from the group consisting of reducing failed login attempts allowed before an account lockout is enabled, reducing authentication methods allowed before an account lockout is enabled, and locking down the plurality of web-connected resources.

20. The system as set forth in claim 15, wherein the deployment components comprise client components to communicate with the computer and an adapter component to interface the client component to a specific native authorization and security service of a protected web-connected resource, and where the web-connected resources comprise at least one device selected from the group consisting of a web server, a web browser, a web-enabled phone, and a special purpose web device.

* * * * *